United States Patent
Ee et al.

(10) Patent No.: US 8,085,506 B1
(45) Date of Patent: Dec. 27, 2011

(54) DISK DRIVE GIMBAL HAVING A STABLE PITCH STATIC ATTITUDE AND RELATED METHOD OF MANUFACTURE

(75) Inventors: Kuen Chee Ee, Temecula, CA (US); Christopher Gene Dunn, Austin, TX (US); Keith Allan Vanderlee, Austin, TX (US); Peter Sung Hahn, Wildomar, CA (US)

(73) Assignee: Magnecomp Corporation, Murrieta, CA (US)

( * ) Notice: Subject to any disclaimer, the term of this patent is extended or adjusted under 35 U.S.C. 154(b) by 1134 days.

(21) Appl. No.: 11/845,210

(22) Filed: Aug. 27, 2007

(51) Int. Cl.
*G11B 5/48* (2006.01)
*G11B 21/16* (2006.01)

(52) U.S. Cl. ............... 360/245.8; 360/245.3; 360/245.9

(58) Field of Classification Search ............ 360/245.3, 360/245.8, 245.9, 246
See application file for complete search history.

(56) References Cited

U.S. PATENT DOCUMENTS

| | | | |
|---|---|---|---|
| 5,228,324 A | 7/1993 | Frackiewicz et al. | |
| 5,491,597 A * | 2/1996 | Bennin et al. | 360/245.9 |
| 5,588,200 A | 12/1996 | Schudel | |
| 6,011,239 A | 1/2000 | Singh et al. | |
| 6,141,187 A | 10/2000 | Wong et al. | |
| 6,532,135 B1 | 3/2003 | Chen et al. | |
| 6,687,091 B1 | 2/2004 | Chen et al. | |
| 6,697,228 B1 | 2/2004 | Mei et al. | |
| 6,714,385 B1 * | 3/2004 | Even et al. | 360/246 |
| 6,940,694 B2 * | 9/2005 | Ohwe et al. | 360/234.6 |
| 6,956,721 B1 | 10/2005 | Khan | |
| 7,826,177 B1 * | 11/2010 | Zhang et al. | 360/245.3 |
| 7,852,604 B2 * | 12/2010 | Sassine | 360/245.3 |
| 2005/0047023 A1 * | 3/2005 | Childers et al. | 360/245.9 |

OTHER PUBLICATIONS

Amax Copper, Inc., 'A Survey of Properties & Applications, Section 3: Mechanical Properties of Wrought OFHC Brand Copper', pages: cover, inside cover, & 17-30.
Merchant, H.D., Wang, J.T., Giannuzzi, L.A. and Liu, Y.L, 'Metallurgy and performance of electrodeposited copper for flexible circuits', Circuit World, 26/4, 2000, pp. 7-14.
High Strength High Conductivity Copper Alloy NK120(C18145).

* cited by examiner

*Primary Examiner* — Jefferson Evans
(74) *Attorney, Agent, or Firm* — Intellectual Property Law Offices of Joel Voelzke, APC

(57) ABSTRACT

A gimbal, a disk drive suspension that includes the gimbal, and a related method of manufacture, wherein the gimbal is configured to be coupled between a disk drive slider and a disk drive load beam. The gimbal includes a strut having a buss and a projection that is coupled to the buss. A combination of the projection and the buss define a gap.

22 Claims, 10 Drawing Sheets

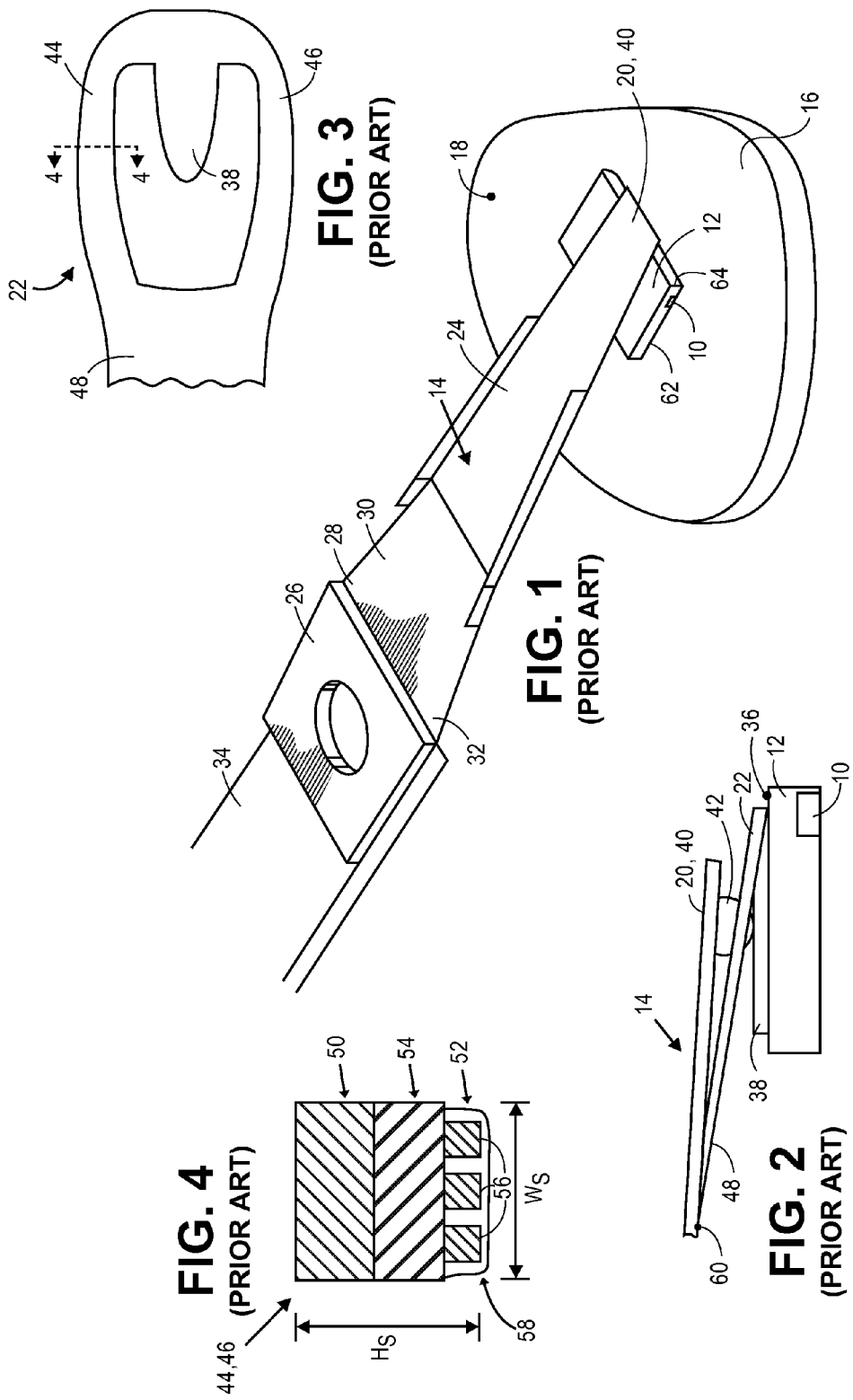

DISK DRIVE GIMBAL HAVING A STABLE PITCH STATIC ATTITUDE AND RELATED METHOD OF MANUFACTURE

FIELD OF THE INVENTION

The invention relates generally to the field of disk drive suspensions. More specifically, the invention relates to gimbals that are configured to be included in disk drive suspensions and provide a stable pitch static attitude ("PSA"), and a related method of manufacture.

BACKGROUND

Suspensions for suspending sliders in hard disk drives are well known in the art. Referring to FIG. 1, in a typical hard disk drive, the disk drive's read-write transducer 10 is included in, or mounted to, a slider 12. The slider has an aerodynamic design and is supported by a suspension 14. The slider's aerodynamic design allows for airflow between the slider and the disk drive's spinning disk 16. This airflow generates lift, which allows the read-write transducer to fly above the spinning disk's surface 18 at an optimal distance for reading data from, or writing data to, the disk.

Referring additionally to FIG. 2, which is a partial side elevational view of the slider and a distal end 20 of the suspension 14, a typical suspension includes a gimbal 22 at the suspension's distal end, a load beam 24, and a baseplate 26 at the suspension's proximal end 28. The gimbal is bonded to the load beam using, for example, a welding device, e.g., a laser spot welding device. Typically, the load beam 24 is formed from stainless steel ("SST") foil and includes a spring portion 30 that applies a loading force, also known as a "pre-load" or "gram force," to the slider 12. The pre-load force counteracts the lift that is generated by the airflow between the slider and the spinning disk 16, and brings the slider into a predetermined close spacing to the disk surface 18 while the disk is spinning. A proximal end 32 of the load beam is coupled to the baseplate 26, which is configured to couple to an actuator arm 34. The actuator arm moves under motor control to precisely position the slider, and thus, the disk drive's read-write transducer 10 relative to the disk surface.

As shown in FIG. 2, the gimbal 22 supports the slider 12. In particular, a top surface 36 of the slider is coupled to a tongue-shaped part (also referred to as a "tongue") 38 of the gimbal, for example, using an adhesive bond. The distal end 40 of the load beam 24 includes a hemispherical projection (also referred to as a "dimple") 42 against which the tongue of the gimbal rests after the gimbal is connected to the load beam. The gimbal, in combination with the load beam's dimple, allows the slider to pitch and roll in response to changes in airflow between the slider and the disk drive's spinning disk 16 that result from irregularities in the disk's surface 18.

Referring additionally to FIG. 3 that is a partial top plan view of an example gimbal 22, the gimbal includes two struts (also known as "outrigger struts") 44 and 46 that couple the gimbal's tongue 38 to the gimbal's proximal end 48, which, in turn, couples to the load beam 24. Referring additionally to the sectional view of FIG. 4, the strut includes the following three layers: a supporting layer 50, a conducting layer 52, and an insulating layer 54, which is coupled between the supporting layer and the conducting layer. The combination of the conducting layer, the insulating layer, and the supporting layer form a microstrip transmission line configuration.

The supporting layer 50 is configured to provide mechanical support for the insulating layer 54 and the conducting layer 52. Typically, the supporting layer is made of a supporting material, e.g., stainless steel ("SST"), the insulating layer (also referred to as a "dielectric layer") is made of an insulating material, e.g., polyimide, and the conducting layer is made of a conducting material, e.g., copper or an alloy thereof. The conducting material is formed into traces 56 that are configured to be coupled to electrical leads (not shown), which interface with the slider's read-write transducer 10. An overlay layer 58, e.g., a low-temperature, modified, acrylic insulation film or a photosensitive resin, can cover the conducting layer, electrically insulate the conducting layer's traces from one another, and inhibit corrosion of the conducting material.

If the conducting layer 52 is made of a copper alloy, the conducting layer typically is formed by cold rolling, which is a process that is known to individuals having ordinary skill in the art. After the conducting layer is cold rolled onto the insulating layer 54, the conducting layer is processed by subtractive chemical milling, e.g., chemical etching. An increasingly popular method for manufacturing conducting layers formed from pure copper is through additive manufacturing methods, e.g., circuit integrated suspension ("CIS") or Additive Circuit Gimbal ("ACG") technology, in which the conducting layer traces 56 are created by plating or electrodepositing pure copper onto the insulating layer. ACG technology provides some advantages over traditional manufacturing methods, e.g., cold rolling copper alloy, in terms of the capability to generate a smaller trace pitch, which offers higher resolution and improved design density and functionality. Pure copper is considered by individuals having ordinary skill in the art to be greater than or equal to 99.0% copper.

Typically, the gimbal 22 is secured to the load beam 24 by laser spot welding the proximal end 48 of the gimbal to the load beam's bottom surface 60. After welding the gimbal to the load beam, the gimbal has to satisfy various mechanical requirements (also referred to as "mechanical characteristics") such as stiffness and geometrical requirements in terms of angles (pitch and roll angles for different axes of rotation). The main factor that influences the mechanical requirements of the gimbal is the supporting layer material, followed by the conducting material. In comparison to the supporting material and the conducting material, the insulating material has very little influence on the mechanical requirements of the gimbal. The geometric requirements, e.g., the pitch and roll angles, are met by adjusting the gimbal at specified locations through either mechanical processes, which are discussed below, or laser adjust processes, both of which are known to individuals having ordinary skill in the art (See the following U.S. patents, which are incorporated by reference herein: U.S. Pat. No. 5,588,200 to Schudel, and U.S. Pat. No. 6,697,228 to Mei et al.).

During operation of the disk drive, the gimbal's tongue 38 supports the slider 12 in a spaced relation to the disk surface 18. It is desirable for the slider to be oriented roughly parallel to the surface of the spinning disk, even if the slider is in an unloaded position, i.e., the slider has been pulled away from the surface of the disk and is no longer flying above the spinning disk. If the slider is not oriented roughly parallel to the disk surface, the slider may contact the surface of the disk 16 when the slider is loaded into its flying position. As improvements are made in computer disk drive technology, disk drive sliders are designed to fly closer to disk surfaces, and thus, the relative orientation of sliders to the disk surfaces becomes even more critical.

A slider's 12 orientation relative to the disk surface 18 is dependent upon the pitch static attitude ("PSA") of the suspension 14. To ensure proper orientation, a suspension, or a portion of the suspension, e.g., the gimbal 22, is adjusted during manufacturing so that the gimbal's tongue 38 is approximately parallel to the expected plane of the disk surface. This adjustment, which is referred to as the pitch static attitude ("PSA") adjustment, is required when the PSA of the suspension after the connection of the gimbal to the load beam 24 and the connection of the load beam to the baseplate 26 is different from a target value.

In general, a PSA adjustment of a gimbal 22 includes bending and/or twisting the gimbal to bring the gimbal's tongue 38 into the desired orientation. More specifically, adjustment of the suspension's final PSA is accomplished by micro-bending the suspension assembly 14 including the gimbal. For example, the PSA adjustment of a gimbal can be facilitated by attaching a pair of clamps to each strut 44 and 46 of the gimbal, and using the clamps to move, e.g., bend and/or twist, the gimbal so the tongue is brought into the desired orientation relative to the expected plane of the disk surface 18. Accurate and rapid pitch and roll static attitude adjustment using laser micro-bending, as described in U.S. Pat. No. 5,228,324 to Frackiewicz et al., U.S. Pat. No. 5,588,200 to Schudel, and U.S. Pat. No. 6,011,239 to Singh et al., which are incorporated by reference herein, is a common practice. If a PSA adjustment is not performed on the gimbal or the gimbal has the wrong PSA value, the gimbal's tongue may not be oriented parallel to the disk surface 18, the slider's aerodynamic design will not function properly, and there is a higher likelihood that an edge 62 or corner 64 of the slider 12 will contact and damage the disk surface.

One observation that is related to the transition from subtractive processes, which use a copper alloy, to additive processes, which use pure copper, is that the shape of the suspension 14 after the PSA adjustment process slowly reverts to its original configuration, i.e., the suspensions shape prior to the PSA adjustment process, due to creep in the pure copper. The copper that is used in the additive processes has significantly lower creep resistance in comparison to the harder, stronger copper alloy that is used in subtractive processes. The copper alloy has a higher resistance to creep because of its composition. The lower creep resistance of pure copper leads to longer settling times after the suspension is formed. This happens because the soft pure copper creeps for many hours or days after the bending that is performed as part of the PSA adjustment process, and before the copper reaches its new equilibrium state.

The longer settling time for pure copper leads to manufacturing throughput issues and larger variations in the final adjusted roll static attitude ("RSA"), pitch static attitude ("PSA"), and gram load values. The creep resistance of a material is proportional to the tensile strength of the material. The yield strength of plated pure copper after normal additive circuit processing is 50-100 MPa, which is significantly less than the yield strength (greater than 500 MPa) of the alloy copper that is used in subtractive processes.

It should, therefore, be appreciated that there is a need for a disk drive suspension 14 that includes a gimbal 22 having a plated or electrodeposited conducting layer 52 with minimal creep. The present invention satisfies these needs.

SUMMARY

Embodiments of the present invention include a gimbal, a suspension that includes the gimbal, and a related method for manufacture, which offer reduced change in slider orientation after the slider has undergone a PSA adjustment. An exemplary embodiment of the invention is a gimbal that is configured to be coupled between a disk drive slider and a disk drive load beam. The gimbal includes a strut having a buss and a projection that is coupled to the buss. A combination of the projection and the buss define a gap.

In other, more detailed features of the invention, the gap that is defined by the combination of the projection and the buss has a width that ranges in value from approximately 50 µm to approximately 150 µm, a length that ranges in value from approximately 300 µm to approximately 1,000 µm, and a height that ranges in value from approximately 15 µm to approximately 25 µm. Also, the buss can have an edge that defines a plurality of notches.

In other, more detailed features of the invention, the buss includes a first portion that has a first width, a second portion that has a second width, and a third portion that is coupled between the first portion and the second portion, and has a third width.

The third width is less than the first width or the second width. Also, the first width can range in value from approximately 100 µm to approximately 500 µm, the second width can range in value from approximately 100 µm to approximately 400 µm, and the third width can range in value from approximately 100 µm to approximately 300 µm. In addition, the third portion can have a length that ranges in value from approximately 500 µm to approximately 1,200 µm.

In other, more detailed features of the invention, the buss has opposing ends and one of the opposing ends of the buss includes an extension. Also, the strut can further include a circuit assembly that is coupled to the projection and configured to be coupled to the disk drive slider. The circuit assembly includes an S-shaped bend. In addition, the circuit assembly can include an insulating layer that has a first surface and a second surface, a conducting layer that is coupled to the first surface of the insulating layer, and a layer that includes a plurality of segments and is coupled to the second surface of the insulating layer. Furthermore, the buss and the plurality of segments can be made of stainless steel, the insulating layer can be made of polyimide, and the conducting layer can be made of copper.

In other, more detailed features of the invention, the strut further includes a circuit assembly that is coupled to the projection and is configured to be coupled to the disk drive slider. The circuit assembly includes an insulating layer, a conducting layer that is made of pure copper and is coupled to the insulating layer, and an overlay layer that is coupled to the conducting layer. The overlay layer is made of epoxy or urethane.

Another exemplary embodiment of the invention is a gimbal that is configured to be coupled between a disk drive slider and a disk drive load beam. The gimbal includes a strut having a circuit assembly. The circuit assembly is configured to be coupled to the disk drive slider, and the circuit assembly includes an S-shaped bend.

Another exemplary embodiment of the invention is a gimbal that is configured to be coupled between a disk drive slider and a disk drive load beam. The gimbal includes a strut having a circuit assembly. The circuit assembly is configured to be coupled to the disk drive slider. The circuit assembly includes an insulating layer, a conducting layer that is made of pure copper and is coupled to the insulating layer, and an overlay layer that is coupled to the conducting layer. The overlay layer is made of epoxy or urethane.

Another exemplary embodiment of the invention is a disk drive suspension that is configured to support a slider having a read-write transducer. The disk drive suspension includes a load beam and a gimbal. The gimbal includes a first end that is coupled to the load beam, a second end that is configured to be coupled to the slider, and a strut. The strut includes a buss that is coupled between the first end and the second end of the gimbal, and a projection that couples to, and extends from, the first end of the gimbal. The projection and the buss define a gap.

An exemplary method according to the invention is a method for forming a disk drive suspension gimbal. The method includes providing a supporting material, an insulating material, and a conducting material; forming a supporting layer from the supporting material; forming an insulating layer from the insulating material that is coupled to the supporting layer; forming a conducting layer from the conducting material that is coupled to the insulating layer; and removing portions of the supporting layer, the insulating layer, and the conducting layer to form a strut that includes a buss and a projection, and the buss and the projection define a gap.

In other, more detailed features of the invention, the method further includes providing an overlay material, and forming an overlay layer from the overlay material that is coupled to the conducting layer. Also, the overlay material can be epoxy or urethane. In addition, the conducting material can be copper, and the step of forming a conducting layer from the conducting material can include plating the conducting material onto the insulating layer or electrodepositing the conducting material onto the insulating layer.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE DRAWINGS

These and other features, aspects, and advantages of the present invention will become better understood with reference to the following description, appended claims, and accompanying drawings, where:

FIG. 1 is a perspective view of an example disk drive suspension and slider.

FIG. 2 is a partial side elevational view of a distal end of the example disk drive suspension and slider shown in FIG. 1.

FIG. 3 is a partial top plan view of an example gimbal that is included as part of the disk drive suspension shown in FIG. 1.

FIG. 4 is a sectional view of the gimbal shown in FIG. 3 along line 4-4.

Unless otherwise indicated, the illustrations in the above figures are not necessarily drawn to scale.

DETAILED DESCRIPTION

Embodiments of the present invention include disk drive suspensions 14, and, in particular, gimbals 22, that include plated or electrodeposited conducting layers 52 in which creep in the material that makes up the conducting layer has minimal effect on PSA stability. Since creep of pure copper in a gimbal's conducting layer is a dominant factor in terms of the gimbal's PSA stability, the embodiments implement one or more of the following ideas: 1) promoting the permanent, plastic deformation of the supporting layer 50 during the adjustment process; 2) reducing the residual stress of the copper at critical regions since creep behavior is directly related to the magnitude of stresses; and/or 3) reducing the coupling between the conducting layer and the supporting layer so that the conducting layer is less affected by the PSA adjustment process.

Figure 5:
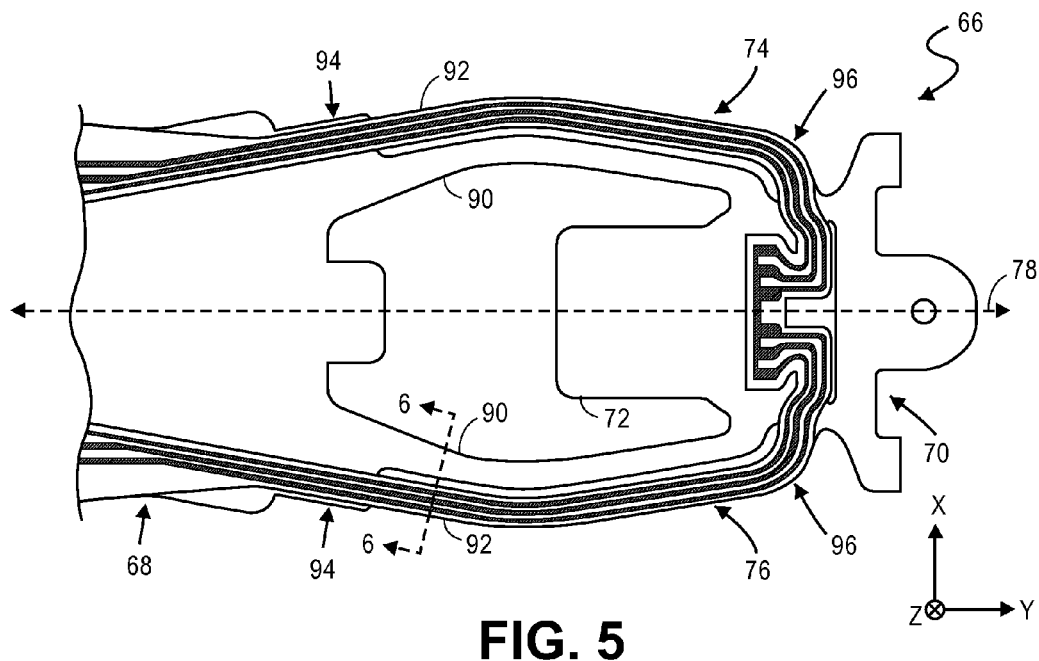
FIG. 5 is a partial bottom plan view of a gimbal according to a preferred embodiment.

Embodiments of the present invention are variations on a nominal gimbal design 66, which is also an embodiment of the present invention and shown in FIGS. 5-8. FIG. 5 is a partial bottom plan view of the nominal gimbal, which includes a proximal end 68, a distal end 70, a tongue 72, and a pair of struts 74 and 76 that couple between the proximal end and the distal end of the gimbal. The tongue is cantilevered from the gimbal's distal end. Conceptually, the gimbal in FIG. 5, as well as the other embodiments that are discussed in this document, has a longitudinal axis 78 that extends the length of the gimbal, and the pair of struts includes a first strut 74 on one side of the gimbal's longitudinal axis and a second strut 76 on the other side of the gimbal's longitudinal axis. The struts have a mirrored configuration, thus, the mechanical configuration of the first strut mirrors the mechanical configuration of the second strut.

Figure 6:
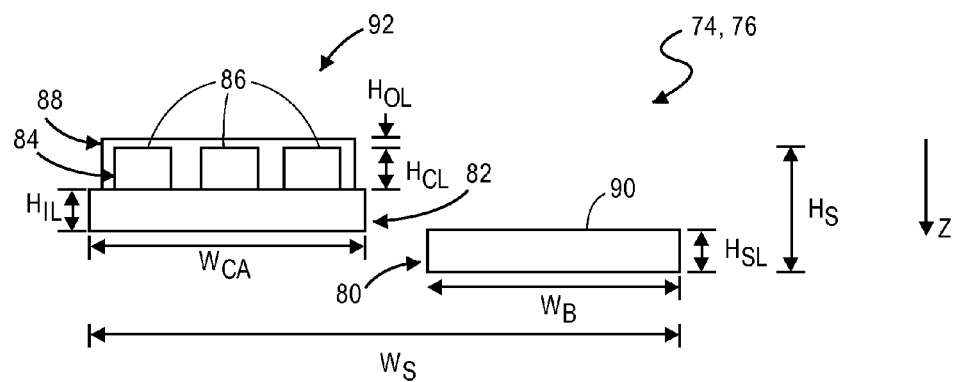
FIG. 6 is a sectional view of the gimbal shown in FIG. 5 along line 6-6.

Referring additionally to FIG. 6, which is a sectional view of a strut 74 and 76 along lines 6-6 in FIG. 5, the strut includes the following: a supporting layer 80, which is made of stainless steel ("SST") and can range in height "$H_{SL}$" from approximately 15 µm to approximately 25 µm; an insulating layer 82, which is made of polyimide and can range in height "$H_{IL}$" from approximately 5 µm to approximately 20 µm, and a conducting layer 84 that is made of plated or electrodeposited pure copper and can range in height "$H_{CL}$" from approximately 7 µm to approximately 15 µm. As shown in FIGS. 5 and 6, the copper conducting layer has been formed into traces 86. Optionally, the strut can include a thin overlay layer 88 having a height "$H_{OL}$" that covers the conducting layer, ranges in height above the conducting layer from approximately 4 µm to approximately 5 µm, and is made of an insulating material, e.g., polyimide or low-temperature, modified, acrylic insulation. The height of each strut "$H_S$," which is defined by the combination of the height of the supporting layer "$H_{SL}$," the height of the insulating layer "$H_{IL}$," the height of the conducting layer "$H_{CL}$," and the height of the overlay layer "$H_{OL}$," can range from approximately 30 µm to approximately 60 µm.

As can be seen in FIGS. 5 and 6, along most of the length of each strut 74 and 76, a portion of the supporting layer referred to as the "buss" 90 is separate from, and does not mechanically support, the combination of the insulating layer 82 and conducting layer 84, which is referred to as the "circuit assembly" 92. The buss extends in a curved/angled manner from the tongue 72 at the gimbal's distal end 70 to the gimbal's proximal end 68. The buss does lie underneath, and supports, the circuit assembly at the strut's proximal end 94. Also, the circuit assembly includes an S-shaped bend 96 at the gimbal's distal end. The width of the buss "$W_B$" can range in value from approximately 50 µm to approximately 200 µm, the width of the circuit assembly "$W_{CA}$" can range in value from approximately 150 µm to approximately 200 µm approximately, and the width of each strut "$W_S$" can range in value from approximately 100 µm to approximately 500 µm. The S-shaped curve in the distal end of the circuit assembly advantageously increases the stiffness of the circuit assembly and reduces the residual stress of the copper in the conducting layer.

Figure 7:
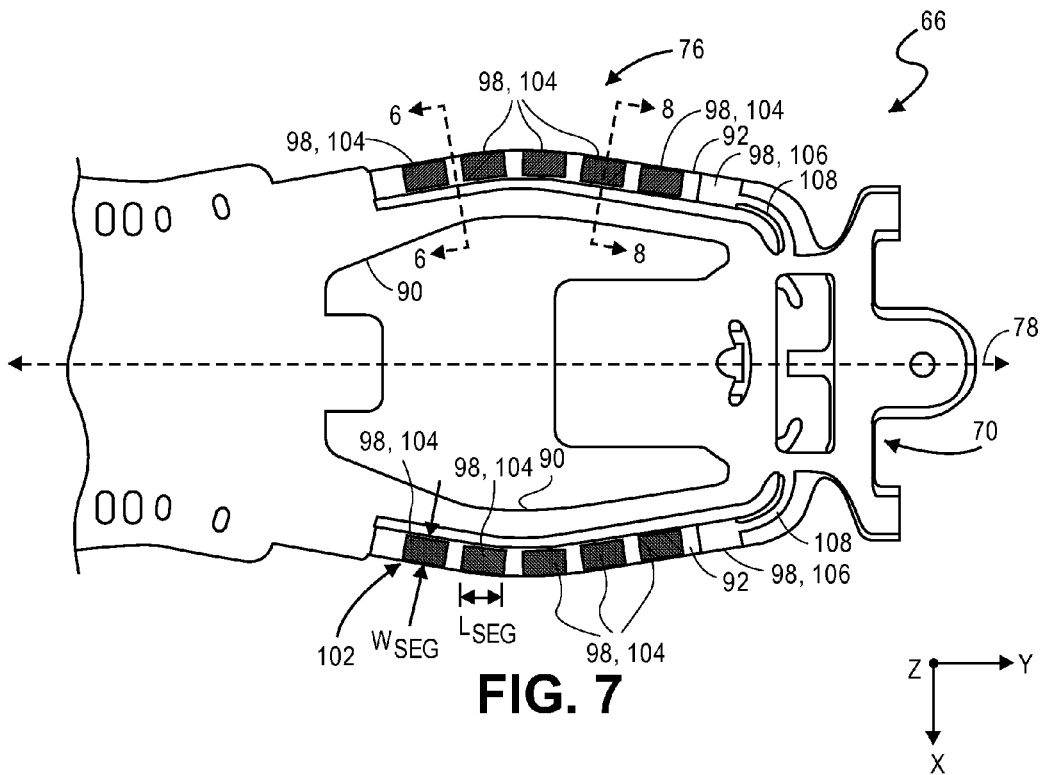
FIG. 7 is a partial top plan view of the gimbal shown in FIG. 5.
Figure 8:
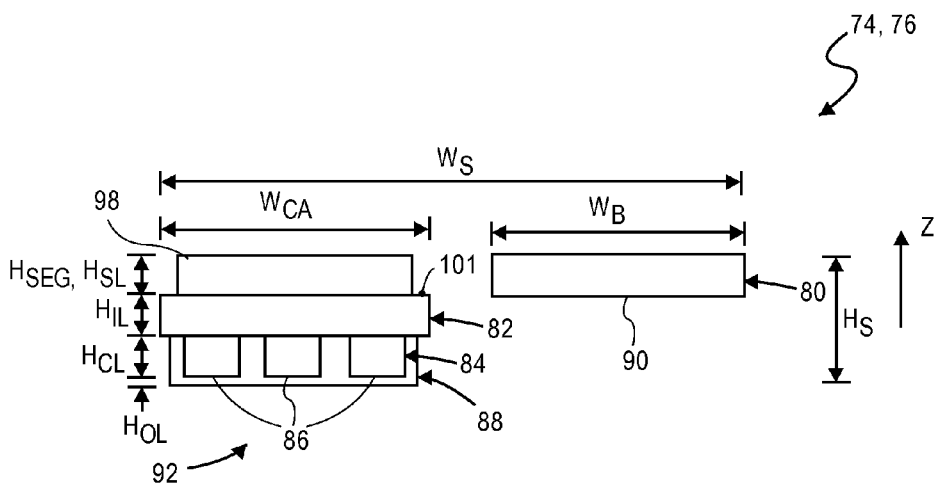
FIG. 8 is a sectional view of the gimbal shown in FIG. 7 along line 8-8.

Referring additionally to FIG. 7, which is a top plan view of the gimbal 66 shown in FIG. 5; and FIG. 8, which is a sectional view of one of the gimbal's struts 74 or 76 along line 8-8, the supporting layer 80 can include a plurality of segments 98, which are made of the same material, e.g., SST, as the rest of the supporting layer including the buss 90, and couple to the bottom surface 100 of the insulating layer 82. In this document, the word "plurality" means two or more. The plurality of segments can have a variety of shapes, for example, the rectangular shape 102 shown in FIG. 7. For the plurality of segments shown in FIG. 7, each of the segments has a height "$H_{SEG}$" that matches the height of the supporting layer "$H_{SL}$." The length of each segment "$L_{SEG}$" can range in value from approximately 100 µm to approximately 200 µm. The width of each segment "$W_{SEG}$" can range in value from approximately 20 µm to approximately 150 µm.

As shown in FIG. 7, there are five segments 104 on each side of the longitudinal axis 78 that are attached only to the circuit assembly 92, and a sixth segment 106 that is coupled to the bottom surface 100 of the circuit assembly and the distal end 70 of the gimbal 66 via a supporting arm 108. The five segments 104 that are coupled only to the circuit assembly are used to electrically couple with signals that are propagated along the traces 86 of the circuit assembly's conducting layer 84, and provide improved electrical performance, as discussed in co-pending U.S. patent application Ser. No. 11/839,373 entitled "Disk Drive Suspension, Gimbal, and Method of Manufacture" to Ziaei et al., which is incorporated by reference herein. The segment 106 that is coupled to both the circuit assembly and the distal end of the gimbal is used to provide mechanical stability to the circuit assembly.

As is recognized in the art, each element 90 defines a gimbal spring arm that flexibly supports gimbal tongue 72. The space between gimbal spring arm 90 and supporting arm 108 defines a gap. As seen in the figure, supporting arm 108 is spaced apart from spring arm 90 and extends generally parallel to an adjacent portion of that spring arm.

Figure 9:
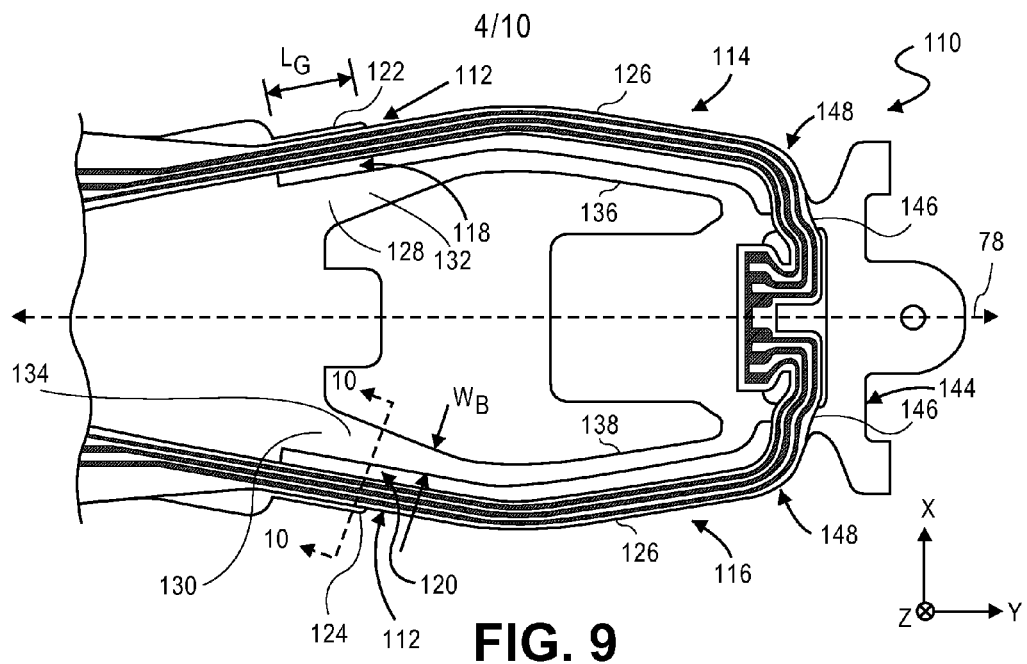
FIG. 9 is a partial bottom plan view of another gimbal according to a preferred embodiment.

Other embodiments of gimbals include variations on the previously discussed nominal gimbal design 66 (see FIGS. 5-8). For example, an embodiment of a gimbal ("embodiment A") 110 is shown in the bottom plan view of FIG. 9 and the sectional view of FIG. 10. As can be seen in FIG. 9, the proximal end 112 of each strut 114 and 116 includes a gap 118 and 120, respectively, which separates a portion 122 and 124, respectively, of the proximal end of the strut that supports the circuit assembly 126 (also referred to as "the projection"), and another portion 128 and 130, respectively, of the proximal end of the strut that includes, or connects, to a proximal end 132 and 134 of the buss 136 and 138, respectively. Advantageously, the gap in the proximal end of the strut reduces mechanical coupling between the circuit assembly's conducting layer 140 and the buss's supporting layer 142, and therefore, reduces the effect of creep in the conducting layer on the gimbal's overall mechanical characteristics.

Figure 10:
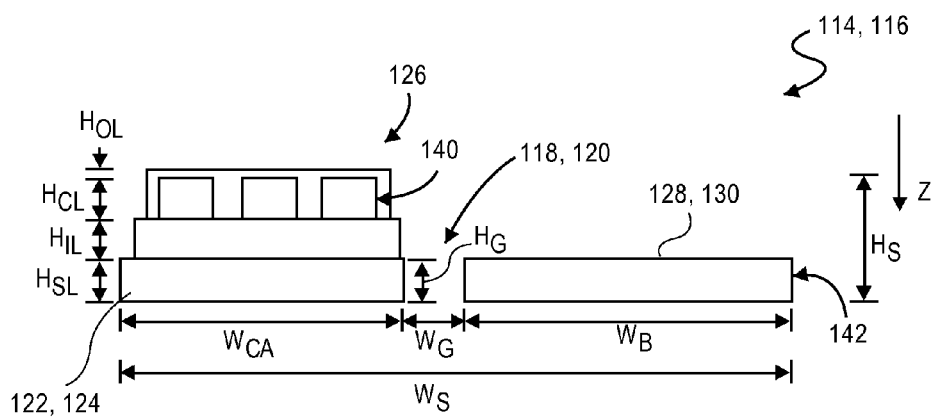
FIG. 10 is a sectional view of the gimbal shown in FIG. 9 along line 10-10.

Referring to FIG. 10, which is a sectional view of the strut 114 and 116 of FIG. 9 along line 10-10, the width of the gap 118 and 120 "$W_G$" can range from approximately 50 μm to approximately 150 μm, the length of the gap "$L_G$" can range from approximately 300 μm to approximately 1,000 μm, and the height of the gap "$H_G$" equals the height of the height of the supporting layer "$H_{SL}$". Embodiment A 110 also differs from the embodiment of the nominal gimbal design 66 shown in FIGS. 5-8 in that the circuit assembly 126 in embodiment A does not include the S-shaped curve 96 at the gimbal's distal end 144. In fact, the distal end 146 of the circuit assembly in each strut of embodiment A has a smooth J-shaped curve 148.

Figure 11:
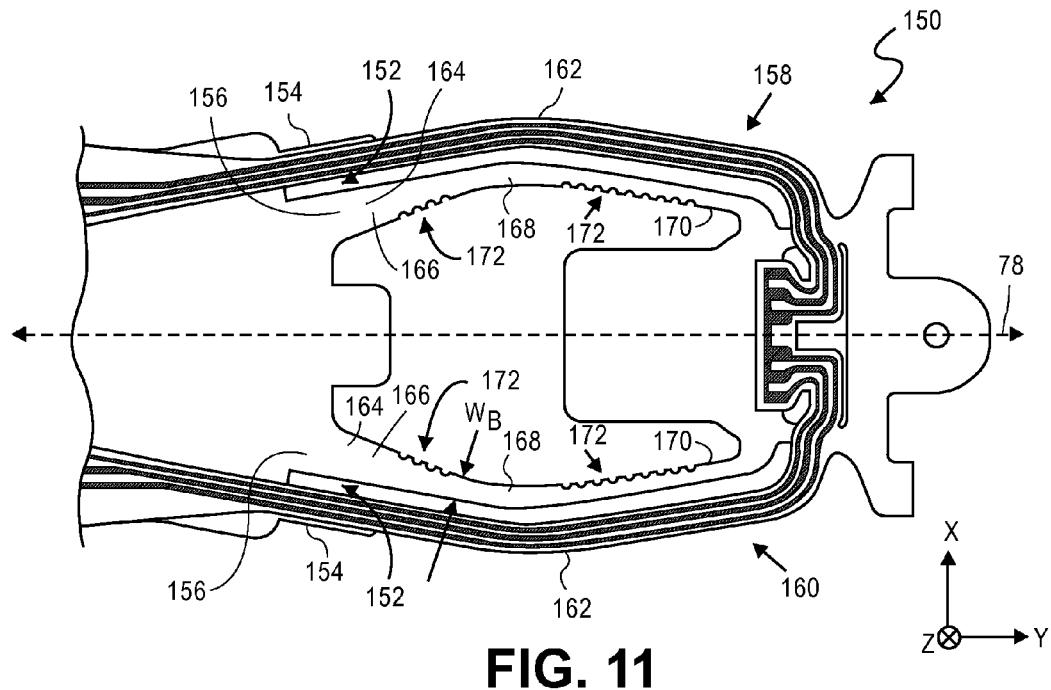
FIG. 11 is a partial bottom plan view of another gimbal according to a preferred embodiment.

An additional embodiment of a gimbal ("embodiment B") 150 is shown in the partial bottom plan view of FIG. 11. Similar to the embodiment 110 show in FIG. 9, embodiment B includes a gap 152 that splits the portion 154 of the proximal end 156 of each strut 158 and 160 that supports the circuit assembly 162 and another portion 164 of the proximal end of the strut that includes, or connects to, a proximal end 166 of the buss 168. Also, the width of the buss 168 "$W_B$" for embodiment B is greater than the width of the buss 136 and 138 for embodiment A 110. For example, if the width of the buss 136 and 138 for embodiment A ranges in value from approximately 100 μm to approximately 150 μm, the width of the buss 168 for embodiment B will range in value from approximately 120 μm to approximately 200 μm. Advantageously, the additional width of embodiment B's buss 168, in comparison to the width of embodiment A's buss 136 and 138, provides additional stiffness to the buss, and thus, reduces the effects of creep in the conducting layer 84 and 140 on the gimbal's overall mechanical characteristics. An additional feature of embodiment B is that the inside edge 170 of the buss 168 in each strut 158 and 160 includes a plurality of notches 172. The plurality of notches that are defined in the inside edge of the buss help to induce plastic deformation during PSA adjustment locally around the notches, and this leads to reduced creep.

Figure 12:
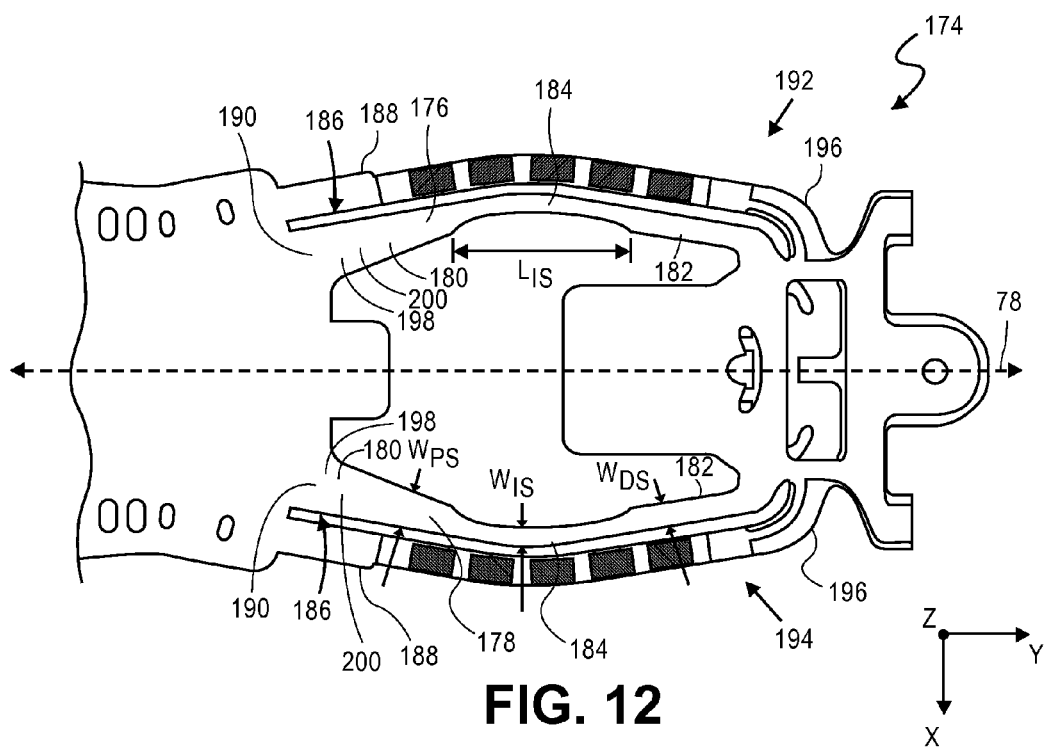
FIG. 12 is a partial top plan view of another gimbal according to a preferred embodiment.

Yet an additional embodiment of a gimbal ("embodiment C") 174 is shown in FIG. 12, which is a partial top plan view of embodiment C's gimbal. In embodiment C, each buss 176 and 178 includes three sections; a proximal section 180 (also referred to as "the first section"), a distal section 182 (also referred to as "the second section"), and an intermediate section 184 (also referred to as "the third section") that is coupled between the proximal and distal sections. The proximal, distal, and intermediate sections of the buss have different widths. As shown in FIG. 12, the width of the proximal section "$W_{PS}$" (also referred to as "the first width"), which can range from approximately 100 μm to approximately 500 μm, is greater than the width of the distal section "$W_{DS}$" (also referred to as "the second width"), which can range from approximately 100 μm to approximately 400 μm. Also, the width of the distal section "$W_{DS}$" is greater than the width of the intermediate section "$W_{IS}$" (also referred to as the "third width"), which can range from approximately 100 μm to approximately 300 μm. The intermediate section has a length "$L_{IS}$," which can range in value from approximately 500 μm to approximately 1,200 μm. Accordingly, the intermediate section of each of embodiment C's busses is narrower than the corresponding section of the buss 90 in the nominal gimbal design 66, embodiment A 110, and embodiment B 150. Advantageously, the reduced width of the intermediate section of the buss 176 and 178 promotes localized, permanent, plastic deformation in the material, e.g., the SST, from which the buss is formed. Similar to embodiments A and B, embodiment C 174 also includes a gap 186 that splits the portion 188 of the proximal end 190 of each strut 192 and 194 that supports the circuit assembly 196, and another portion 198 of the proximal end of the strut that includes, or connects to, a proximal end 200 of each buss.

Figure 13:
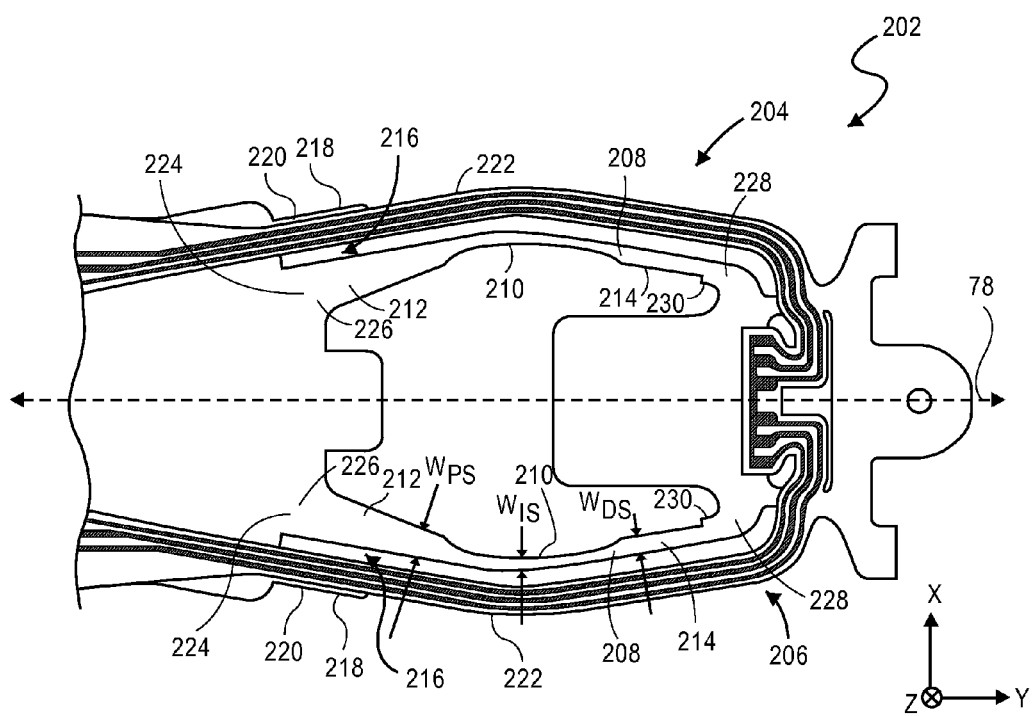
FIG. 13 is a partial bottom plan view of another gimbal according to a preferred embodiment.

Another embodiment of a gimbal ("embodiment D") 202 is shown in the partial bottom plan view of FIG. 13. Similar to embodiment C 174, each strut 204 and 206 of embodiment D includes a buss 208 having an intermediate section 210 with a width "$W_{IS}$" that is smaller than the width of the proximal section 212 "$W_{PS}$" or the width of the distal section 214 "$W_{DS}$." Each strut of embodiment D also includes a gap 216 that splits the portion 218 of the proximal end 220 of the strut that supports the circuit assembly 222 and another portion 224 of the proximal end of the strut that includes, or connects to, a proximal end 226 of the buss. Furthermore, the distal end 228 of each buss includes an extension 230, or tab, that increases the width of the distal section of the buss "$W_{DS}$". The extension at the distal end of the buss provides additional stiffness to the buss, and thus, reduces the effects of creep in the conducting layer material, and thus, increases the gimbal's PSA stability.

Comparative data for the nominal gimbal design 66 and embodiments A-D 110, 150, 174, and 202 is shown in the following table.

| Gimbal Type | PSA Change after 5 days (degree) | $K_P$ (μNm/deg) | Percent Change in $K_P$ (%) | $K_R$ (μNm/deg) | Percent Change in $K_R$ (%) |
|---|---|---|---|---|---|
| Nominal Design | 0.19 | 0.54 | — | 0.50 | — |
| Embodiment A | 0.15 | 0.50 | −7 | 0.46 | −8 |
| Embodiment B | 0.14 | 0.58 | +7 | 0.50 | 0 |
| Embodiment C | 0.13 | 0.58 | +7 | 0.49 | −2 |
| Embodiment D | 0.09 | 0.56 | +4 | 0.45 | −10 |

In the above table, the PSA change is the measured amount of angular change (in degrees) in the tongue's orientation after five days to the tongue's orientation immediately after the PSA adjustment. $K_P$ is the gimbal's pitch stiffness in units of μNm/deg, and $K_R$ is the gimbal's roll stiffness in units of μNm/deg.

The comparative data shows that by adding the gap 118, 120, 152, 186, and 216 that splits the proximal end 112, 156, 190, and 220 of the strut 114, 116, 158, 160, 192, 194, 204, and 206, and by changing the shape 96 and 148 of the circuit assembly 92 and 126 near the distal end 70 and 144 of the gimbal 66, 110, 150, 174, and 202, the PSA change for embodiment A 110 after the five day period of time is 0.04 degree less in reference to the nominal gimbal design 66. Also, the pitch stiffness value and the roll stiffness value are a little less for embodiment A than the nominal gimbal design, but remain comparable to the nominal gimbal design.

Also, the comparative data shows that by extending the width of the buss 168 "$W_B$" (see embodiment B 150) and adding notches 172 in comparison to the width of the nominal gimbal design's buss 90, or by narrowing the width of the intermediate section 184 and 210 "$W_{IS}$" of the buss 176, 178, and 208 (see embodiments C and D 174 and 202, respectively), the PSA change is less and the gimbal's pitch stiffness "$K_P$" is increased, but remains comparable to the nominal gimbal design. Having a slightly increased gimbal pitch stiffness aids in reducing the effects of creep in the conducting layer material, e.g., the plated or electrodeposited pure copper, and is reflected in the decreased value of PSA change after five days. The overall contribution to the stiffness resulting from the supporting layer 80 and 142 increases with the wider buss.

Embodiments 66, 110, 150, 174, and 202 of the present invention can be formed using a variety of selectively additive processes that are known to individuals having ordinary skill in the art, for example, casting, vapor deposition, and plating which build-up the supporting layer 80 and 142 first followed by the insulating layer 82, and then followed by the conducting layer 84 and 140. Thus, the supporting layer, the insulating layer and the conducting layer are formed in a sequential manner on top of one another using additive processes that are known to individuals having ordinary skill in the art.

Figure 14A:
FIG. 14A is a sectional view of a supporting layer that is formed according to a preferred method.
Figure 14B:
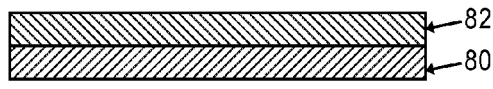
FIG. 14B is a sectional view of an insulating layer and the supporting layer of FIG. 14A where the insulating layer is formed according to a preferred method.

FIGS. 14A-L are sectional views of the layers 80-84 that are included in the struts 74 and 76 of the embodiments 66 shown in FIGS. 5-8. FIGS. 14A-L illustrate the sequential formation of the individual layers. More specifically, FIG. 14A shows the supporting layer 80 after it has been formed from the supporting material, e.g., cold-rolled 300 series stainless steel. Next, FIG. 14B shows the insulating layer 82 after it has been formed from the insulating material, e.g., polyimide, on top of the supporting layer and cured. The insulating layer is then processed through photo-imaging processes to achieve a pattern in the insulating layer. After patterning, the insulating layer is baked to fully cure the insulating layer. Subsequently, a vapor deposited adhesion layer 232 can be deposited on top of the insulating layer, as described in co-pending U.S. patent application Ser. Nos. 11/179,707 and 11/340,298 to Schreiber et al., which are incorporated by reference herein.

Figure 14C:
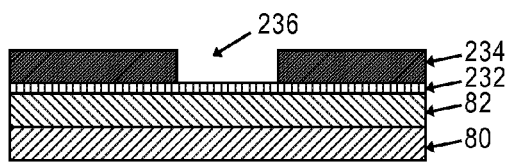
FIG. 14C is a sectional view of a resist layer, an adhesion layer, and the insulating and supporting layers of FIG. 14B where the resist layer and the adhesion layer are formed according to a preferred method.
Figure 14D:
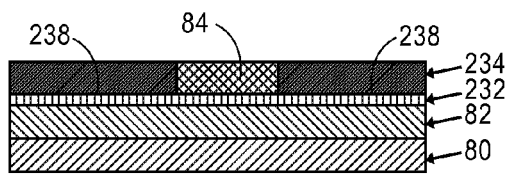
FIG. 14D is a sectional view of a conducting layer and the resist, adhesion, insulating, and supporting layers of FIG. 14C where the conducting layer is formed according to a preferred method.
Figure 14E:
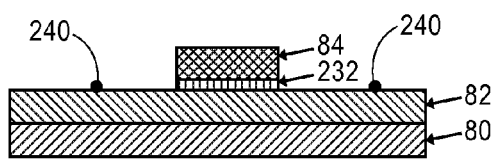
FIG. 14E is a sectional view of the conducting, adhesion, insulating, and supporting layers of FIG. 14D where the resist layer and portions of the adhesion layer have been removed according to a preferred method.

FIG. 14C shows a resist layer 234 that has been formed from a resist material on top of the adhesion layer 232. The resist material has been exposed and developed using, for example, a photo-resist process, which defines a resist portion, such that the resist layer includes a gap 236. FIG. 14D shows the conducting layer 84 after it has been formed from the conducting material, e.g., plated or electrodeposited pure copper, on top of the adhesion layer and within the gap in the resist layer. Next, the resist layer and portions 238 of the adhesion layer that are coupled between the resist layer and the insulating layer 82, are removed, e.g., stripped, from the top surface 240 of the insulating layer, as shown in FIG. 14E. While not shown in FIGS. 14D-L, the conducting layer can be formed into traces 86, as shown in FIGS. 6 and 8.

Figure 14F:
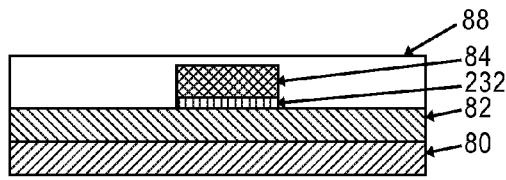
FIG. 14F is a sectional view of an overlay layer and the conducting, adhesion, insulating, and supporting layers of FIG. 14E where the overlay layer has been formed according to a preferred method.
Figure 14G:
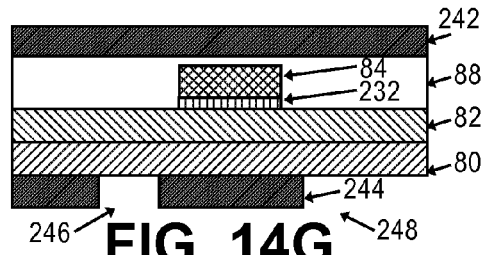
FIG. 14G is a sectional view of resist layers and the overlay, conducting, adhesion, insulating, and supporting layers of FIG. 14F where the resist layers have been formed according to a preferred method.
Figure 14H:
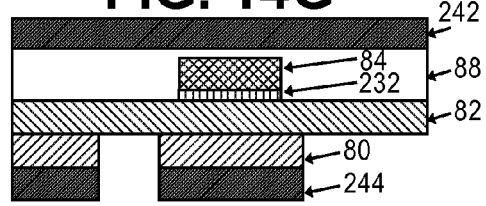
FIG. 14H is a sectional view of the resist, overlay, conducting, adhesion, insulating, and supporting layers of FIG. 14G where portions of the supporting layer have been removed according to a preferred method.
Figure 14I:
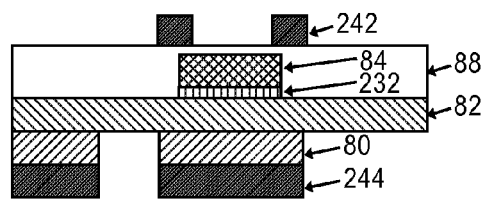
FIG. 14I is a sectional view of the resist, overlay, conducting, adhesion, insulating, and supporting layers of FIG. 14H where portions of the resist layer that is coupled to the overlay layer have been removed.
Figure 14J:
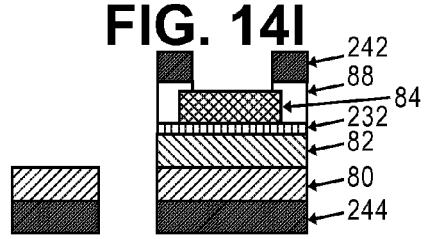
FIG. 14J is a sectional view of the resist, overlay, conducting, adhesion, insulating, and supporting layers of FIG. 14I where portions of the insulating and overlay layers have been removed according to a preferred method.
Figure 14K:
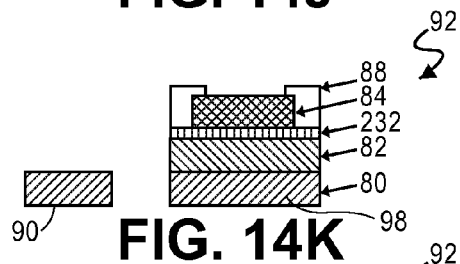
FIG. 14K is a sectional view of the overlay, conducting, adhesion, insulating, and supporting layers of FIG. 14J where the resist layers have been removed according to a preferred method.
Figure 14L:
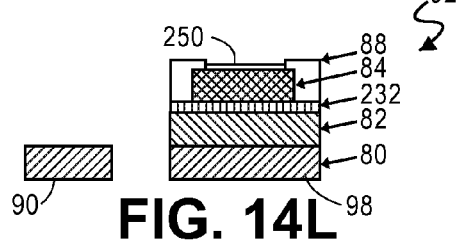
FIG. 14L is a sectional view of the overlay, conducting, adhesion, insulating, and supporting layers of FIG. 14K where the conducting layer has had a layer of gold or nickel and gold deposited on top of it according to a preferred method.

FIG. 14F shows an overlay layer 88 that has been deposited on top of the initial insulating layer 82 and the conducting layer 84, and cured, for example, using a photo-imaging process. In FIG. 14G, resist layers 242 and 244 have been added to the overlay layer and the supporting layer 80, respectively. The resist layer 244 that is coupled to the supporting layer has been formed with two openings 246 and 248, through which the support layer is etched as shown in FIG. 14H. The resist layer 244 that is coupled to the supporting layer is formed in a shape that defines the shape 102 of the plurality of segments 98. FIG. 14I shows the partial removal of the resist layer 242 from above the overlay layer. As shown in FIG. 14J, the overlay layer and the insulating layer have been etched, and in FIG. 14K, the resist layers 242 and 244 have been removed. The conducting layer is shown plated with a thin layer 250 of gold or nickel and gold in FIG. 14L. It should be apparent to those having ordinary skill in the art that the use of photosensitive polyimide processes in the formation of the dielectric features herein is additionally incorporated by reference. In other embodiments, the resist layer 242 that is above the overlay layer is configured so as to cover the full width of the conducting layer. In these embodiments, the conducting layer remains covered with the overlay layer after processing is complete, and the conducting layer is not plated with a thin layer of gold or nickel followed by gold.

A manufacturing process that is similar to that shown in FIGS. 14A-L is shown in the sectional views shown in FIGS. 15A-L, which illustrate the steps of the process for depositing/forming the portions of the strut 74 and 76 where, in sectional view, the insulating layer 82 is not connected to the supporting layer 80, for example, in the case where the sectional view is taken through a portion of the strut without a segment 98 (see FIG. 6). In these instances, the sectional views of FIGS. 15A-F match the sectional views of FIGS. 14A-F, respectively (see above discussion of FIGS. 14A-F), and thus, the discussion of FIGS. 15A-F, which match FIGS. 15A-F, will not be repeated.

Figure 15A:
FIG. 15A is a sectional view of a supporting layer that is formed according to a preferred method.
Figure 15B:
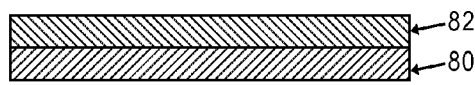
FIG. 15B is a sectional view of an insulating layer and the supporting layer of FIG. 15A where the insulating layer is formed according to a preferred method.
Figure 15C:
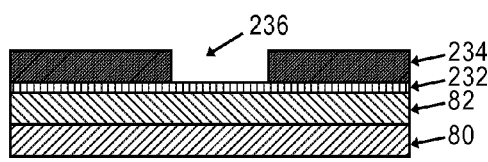
FIG. 15C is a sectional view of a resist layer, an adhesion layer, and the insulating and supporting layers of FIG. 15B where the resist layer and the adhesion layer are formed according to a preferred method.
Figure 15D:
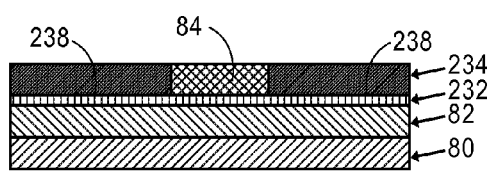
FIG. 15D is a sectional view of a conducting layer and the resist, adhesion, insulating, and supporting layers of FIG. 15C where the conducting layer is formed according to a preferred method.
Figure 15E:
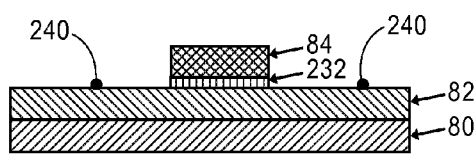
FIG. 15E is a sectional view of the conducting, adhesion, insulating, and supporting layers of FIG. 15D where the resist layer and portions of the adhesion layer have been removed according to a preferred method.
Figure 15F:
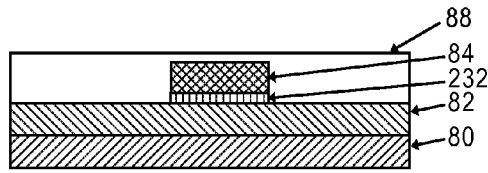
FIG. 15F is a sectional view of an overlay layer and the conducting, adhesion, insulating, and supporting layers of FIG. 15E where the overlay layer has been formed according to a preferred method.
Figure 15G:
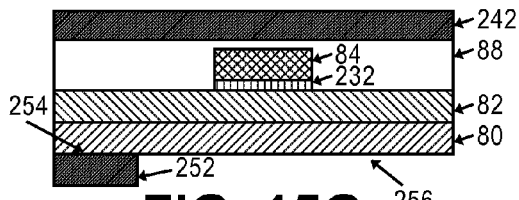
FIG. 15G is a sectional view of resist layers and the overlay, conducting, adhesion, insulating, and supporting layers of FIG. 15F where the resist layers have been formed according to a preferred method.
Figure 15H:
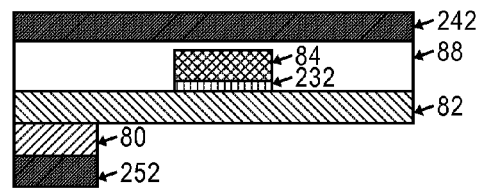
FIG. 15H is a sectional view of the resist, overlay, conducting, adhesion, insulating, and supporting layers of FIG. 15G where a portion of the supporting layer has been removed according to a preferred method.
Figure 15I:
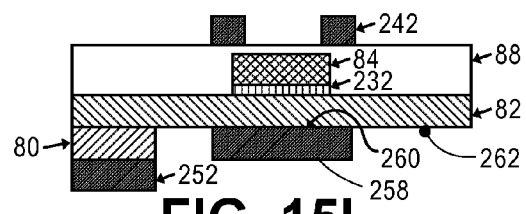
FIG. 15I is a sectional view of the resist, overlay, conducting, adhesion, insulating, and supporting layers of FIG. 15H where portions of the resist layer that is coupled to the overlay layer have been removed and additional resist material has been added to a portion of a bottom surface of the insulating layer.
Figure 15J:
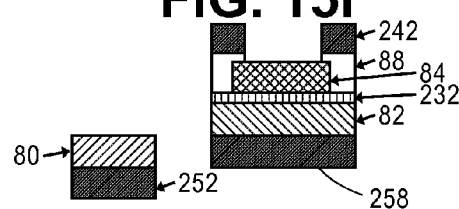
FIG. 15J is a sectional view of the resist, overlay, conducting, adhesion, insulating, and supporting layers of FIG. 15I where portions of the insulating and overlay layers have been removed according to a preferred method.
Figure 15K:
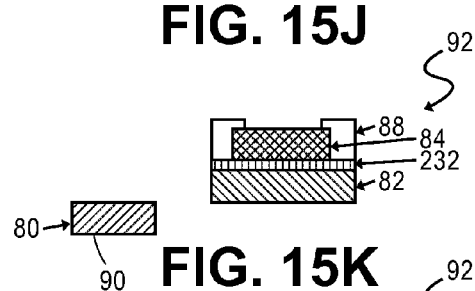
FIG. 15K is a sectional view of the overlay, conducting, adhesion, insulating, and supporting layers of FIG. 15J where the resist layers have been removed according to a preferred method.
Figure 15L:
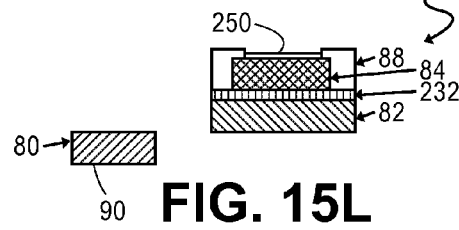
FIG. 15L is a sectional view of the overlay, conducting, adhesion, insulating, and supporting layers of FIG. 15K where the conducting layer has had a layer of gold or nickel and gold deposited on top of it according to a preferred method.

In FIG. 15G, resist layers 242 and 252 have been added to the overlay layer 88 and the supporting layer 80, respectively. The resist layer 252 that is coupled to the supporting layer has been formed to cover only a portion 254 of the supporting layer. The portion 256 of the support layer that is exposed is etched as shown in FIG. 15H. FIG. 15I shows the partial removal of the resist layer 242 from above the overlay layer, and the addition of resist material 258 to a portion 260 of the bottom surface 262 of the insulating layer 82. As shown in FIG. 15J, the insulating layer and the overlay layer have been etched, and in FIG. 15K, the resist layers 242, 252, and 258 have been removed. The conducting layer 84 is shown plated with a thin layer 250 of gold or nickel and gold in FIG. 15L.

Figure 16:
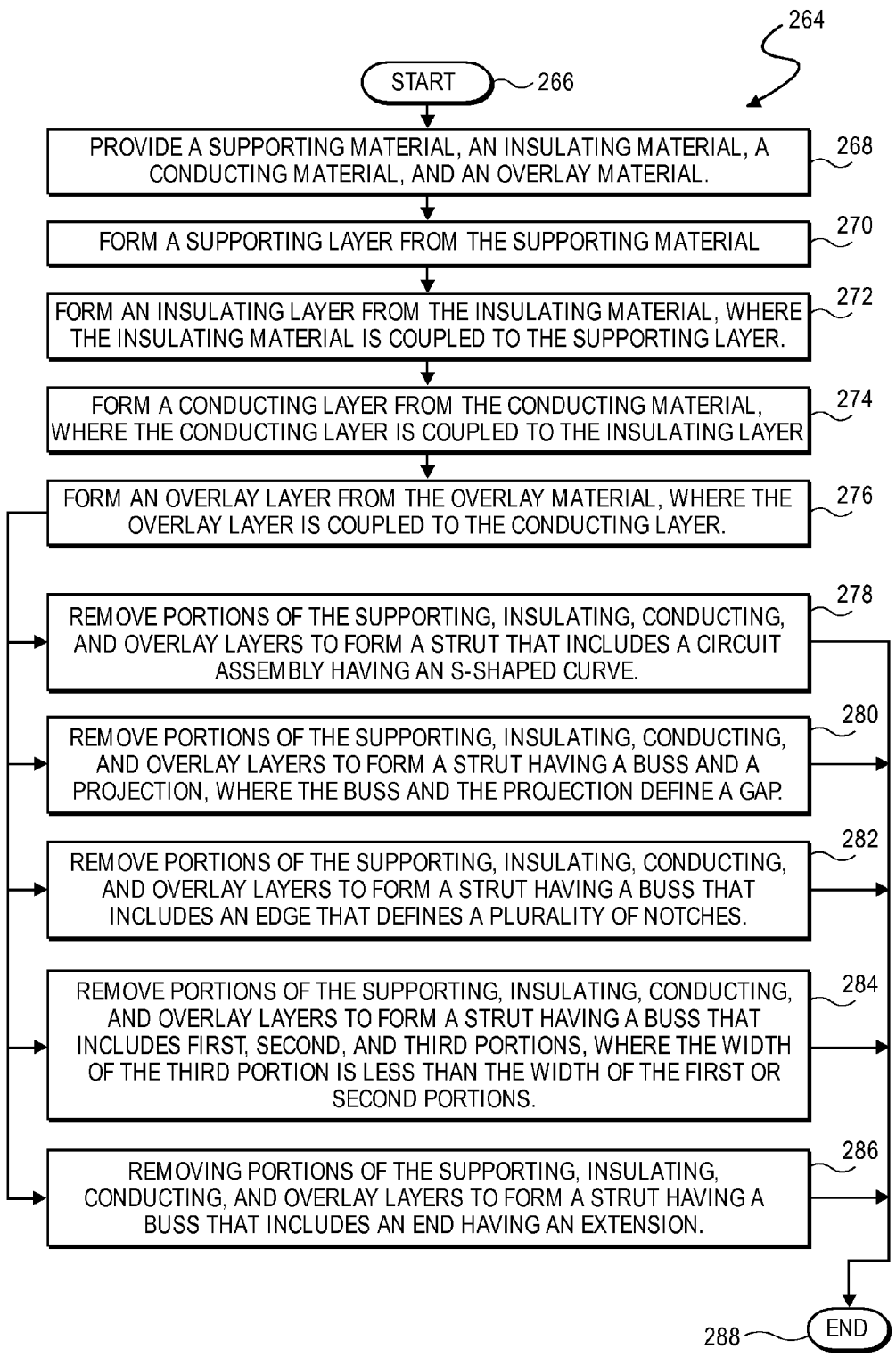
FIG. 16 illustrates a flowchart for an example method of manufacturing a disk drive suspension according to the invention.

An exemplary method for manufacturing a disk drive suspension gimbal 66, 110, 150, 174, and 202 according to the present invention is illustrated in the algorithm 264 of FIG. 16. After starting the method at step 266, the next step 268 is to provide a supporting material, an insulating material, a conducting material, and an overlay material. The next step 270 is to form a supporting layer 80 from the supporting material. Next, at step 272, an insulating layer 82 is formed from the insulating material so the insulating layer is coupled to the supporting layer. At step 274, a conducting layer 84 is formed from the conducting material, where the conducting layer is coupled to the insulating layer. Next, at step 276, an overlay layer 88 is formed from the overlay material, so the overlay layer is coupled to the conducting layer.

The algorithm 264 also includes at least one of the following steps: removing portions of the supporting, insulating, conducting, and overlay layers 80, 82, 84, and 88, respectively, to form a strut 74 or 76 that includes a circuit assembly 92 having an S-shaped curve 96 (see step 278); removing portions of the supporting, insulating, conducting, and overlay layers to form a strut 114, 116, 158, 160, 192, 194, 204, and 206 having a buss 136, 138, 168, 176, 178, and 208 and a projection 122, 124, 154, 188, and 218, where the buss and the projection define a gap 118, 120, 152, 186, and 216 (see step 280); removing portions of the supporting, insulating, conducting, and overlay layers to form a strut having a buss that includes an edge 170 that defines a plurality of notches 172 (see step 282); removing portions of the supporting, insulating, conducting, and overlay layers to form a strut having a buss that includes a first portion 180 and 212, a second portion 182 and 214, and a third portion 184 and 210, where the width of the third portion "$W_{IS}$" is less than the width of the first or second portions "$W_{PS}$" and "$W_{DS}$," respectively (see step 284); and removing portions of the supporting, insulating, conducting, and overlay layers to form a strut having a buss that includes an end 228 having an extension 230 (see step 286). The method ends at step 288.

One way of increasing creep resistance and reduce suspension settling time is to increase the yield strength of the copper in the conducting layer 84 and 140. The biggest impact on the yield strength of plated copper is the annealing that occurs in the copper during the high-temperature curing process of the overlay layer 88, for example, when the overlay layer is polyimide. The plated pure copper in the conducting layer has a yield strength greater than 200 MPa. The yield strength of the pure copper drops down to approximately 90 MPa to approximately 100 MPa after the high-temperature (reaching from approximately 300° C. to approximately 400° C.) curing process that is performed on the overlay layer.

Figure 17:
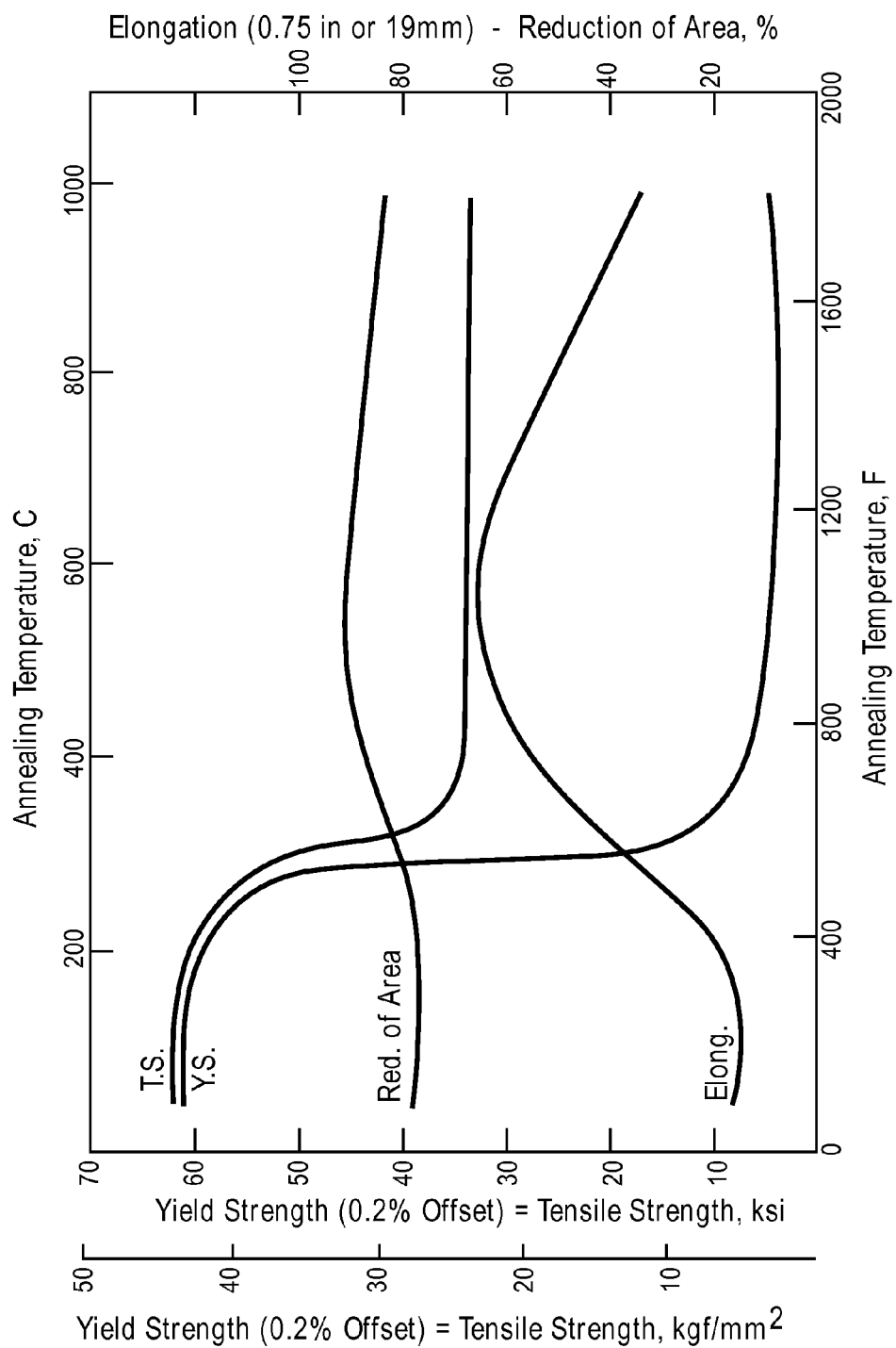
FIG. 17 is a graph of the effect of annealing temperature on the tensile properties of hard draw copper.

In embodiments of the present invention, the overlay layer 88 is made of epoxy or urethane, for which the curing process only requires temperatures having a maximum value from approximately 150° C. to approximately 190° C. By reducing the maximum overlay layer processing temperature below 200° C., the effects of annealing the copper are limited or eliminated. This allows the copper to maintain its yield strength of greater than 200 MPa, and thus, improves the copper's creep resistance. FIG. 17 (taken from Crosby R. C. and Desy D. H., *Dispersion-Strengthening in Copper-Alumina and Copper-Yttria Alloys*, BM-RI-7266, Bureau of Mines, Washington, D.C., June 1969, which is incorporated by reference herein) shows a standard softening curve for pure copper and illustrates the fact that copper annealing starts to impact mechanical properties when the temperature at which the copper is processed reaches above 200° C. In addition to having favorable curing temperatures, epoxy and urethane advantageously are readily available, are low in cost, and provide non-conductive circuit protection overlay layers.

Advantageously, embodiments of gimbals 66, 110, 150, 174, and 202 according to the present invention promote the following: localized, permanent, plastic deformation in the buss 90, 136, 138, 168, 176, 178, and 208; increased stiffness in the distal end of the buss and the distal end of the circuit assembly 92, 126, 162, 196, and 222; increased stiffness in general for the circuit assembly as a result of the conducting layer 84 and 140 including copper with a higher yield strength; and reduced coupling between the circuit assembly's conducting layer and the buss. Accordingly, the embodiments reduce the effect of creep in the material that makes up the conducting layer on the overall mechanical characteristics, e.g., the stability of the pitch angle, of the gimbal, while allowing for the use of plated or electrodeposited copper in the conducting layer. This facilitates the use of conducting layers that include plated or electrodeposited materials instead of cold-rolled materials, and the improvement of gimbal manufacturing yields.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

We claim:

1. A gimbal that is configured to be coupled between a disk drive slider and a disk drive load beam, the gimbal comprising:
   a stainless steel gimbal spring arm, the spring arm flexibly supporting a gimbal tongue;
   a circuit assembly disposed laterally from the spring arm; and
   a stainless steel supporting arm coupled to a bottom surface of the circuit assembly, the supporting arm being spaced apart from the spring arm by a gap;
   wherein the circuit assembly has coupled to its bottom surface a plurality of stainless steel segments, the segments being electrically isolated from each other, one of the segments being electrically connected to the spring arm through the supporting arm.

2. The gimbal of claim 1 wherein the supporting arm extends generally parallel to an adjacent portion of the spring arm.

3. The gimbal of claim 1 wherein the supporting arm extends from a distal end of the gimbal.

4. The gimbal of claim 1 wherein the supporting arm extends from a proximal end of the gimbal.

5. The gimbal of claim 1 wherein the circuit assembly includes an insulating layer and a conducting layer, and the stainless steel segments are located on a side of the insulating layer opposite the conductive layer.

6. A gimbal that is configured to be coupled between a disk drive slider and a disk drive load beam, the gimbal comprising:
   a stainless steel gimbal spring arm, the spring arm flexibly supporting a gimbal tongue;
   a circuit assembly disposed laterally from the spring arm; and
   a stainless steel supporting arm coupled to a bottom surface of the circuit assembly, the supporting arm being spaced apart from the spring arm by a gap having a width that ranges in value from approximately 50 μm to approximately 150 μm, a length that ranges in value from approximately 300 μm to approximately 1,000 μm, and a height that ranges in value from approximately 15 μm to approximately 25 μm.

7. The gimbal of claim 6 wherein the supporting arm is connected to a stainless steel segment underneath the flexible circuit at a location at which the flexible circuit is unsupported, the stainless steel segment being wider than the supporting arm.

8. A gimbal that is configured to be coupled between a disk drive slider and a disk drive load beam, the gimbal comprising:
　a stainless steel gimbal spring arm, the spring arm flexibly supporting a gimbal tongue;
　a circuit assembly disposed laterally from the spring arm, the circuit assembly including an insulating layer, a conducting layer coupled to the insulating layer, and an overlayer comprising urethane disposed on a side of the conducting layer opposite the insulating layer; and
　a stainless steel supporting arm coupled to a bottom surface of the circuit assembly, the supporting arm being spaced apart from the spring arm by a gap.

9. The gimbal of claim 8 wherein the conducting layer comprises pure copper.

10. A gimbal that is configured to be coupled between a disk drive slider and a disk drive load beam, the gimbal comprising:
　a stainless steel gimbal spring arm, the spring arm flexibly supporting a gimbal tongue;
　a circuit assembly disposed laterally from the spring arm;
　wherein:
　the gimbal spring arm includes:
　　a first portion that has a first width;
　　a second portion that has a second width; and
　　a third portion that is coupled between the first portion and the second portion, and has a third width; and
　the third width is less than the first width or the second width.

11. The gimbal of claim 10 wherein the circuit assembly has coupled thereto a plurality of stainless steel segments, the segments being electrically isolated from each other and electrically isolated from the spring arm.

12. The gimbal of claim 10 wherein the gimbal spring arm has an edge that defines a plurality of notches.

13. A suspension including the gimbal of claim 10.

14. A gimbal that is configured to be coupled between a disk drive slider and a disk drive load beam, the gimbal comprising:
　a stainless steel gimbal spring arm, the spring arm flexibly supporting a gimbal tongue; and
　a circuit assembly disposed laterally from the spring arm; and
wherein the circuit assembly has coupled thereto a plurality of stainless steel segments, the segments being electrically isolated from the spring arm; and
wherein the gimbal spring arm includes:
　a first portion that has a first width;
　a second portion that has a second width; and
　a third portion that is coupled between the first portion and the second portion, and has a third width; and
　the third width is less than the first width or the second width.

15. The gimbal of claim 14 wherein the segments are electrically isolated from each other.

16. The gimbal of claim 14 further comprising a stainless steel supporting arm coupled to a bottom surface of the circuit assembly, the supporting arm being spaced apart from the spring arm by a gap.

17. The gimbal of claim 16 wherein the supporting arm extends generally parallel to an adjacent portion of the spring arm.

18. The gimbal of claim 16 wherein the supporting arm extends from a distal end of the gimbal.

19. The gimbal of claim 16 wherein the supporting arm extends from a proximal end of the gimbal.

20. The gimbal of claim 14 wherein the gimbal spring arm has an edge that defines a plurality of notches.

21. A suspension including the gimbal of claim 14.

22. A disk drive including the gimbal of claim 14.

* * * * *